(12) United States Patent
Zhou et al.

(10) Patent No.: US 10,378,879 B2
(45) Date of Patent: Aug. 13, 2019

(54) THICKNESS DETECTION EXPERIMENT PLATFORM

(71) Applicants: Tyco Electronics (Shanghai) Co. Ltd., Shanghai (CN); TE Connectivity Corporation, Berwyn, PA (US); Shenzhen AMI Technology Co. Ltd., Shenzhen (CN)

(72) Inventors: Lei Zhou, Shanghai (CN); Dandan Zhang, Shanghai (CN); Roberto Francisco-Yi Lu, Shanghai (CN); Qinglong Zeng, Shanghai (CN)

(73) Assignees: Tyco Electronics (Shanghai) Co. Ltd., Shanghai (CN); TE Connectivity Corporation, Berywn, PA (US); Shenzhen AMI Technology Co., Ltd., Shenzhen (CN)

( * ) Notice: Subject to any disclaimer, the term of this patent is extended or adjusted under 35 U.S.C. 154(b) by 0 days.

(21) Appl. No.: 15/798,484

(22) Filed: Oct. 31, 2017

(65) Prior Publication Data

US 2018/0120093 A1 May 3, 2018

(30) Foreign Application Priority Data

Oct. 31, 2016 (CN) .......................... 2016 1 0940078

(51) Int. Cl.
*G01B 11/06* (2006.01)
*G05B 19/401* (2006.01)
*G01B 21/04* (2006.01)

(52) U.S. Cl.
CPC .......... *G01B 11/06* (2013.01); *G01B 11/0691* (2013.01); *G01B 21/042* (2013.01); *G05B 19/401* (2013.01); *G01B 2210/44* (2013.01)

(58) Field of Classification Search
CPC . G01B 5/06; G01B 7/06; G01B 11/06; G01B 11/0691; G01B 21/042; G05B 19/401; G05B 2210/44; B23K 26/04
See application file for complete search history.

(56) References Cited

U.S. PATENT DOCUMENTS

2004/0060910 A1* 4/2004 Schramm ............... B23K 26/04
219/121.69
2015/0292853 A1* 10/2015 Auzinger ................. G01B 5/06
33/557

* cited by examiner

*Primary Examiner* — Jamil Ahmed
(74) *Attorney, Agent, or Firm* — Barley Snyder

(57) ABSTRACT

A thickness detection experiment platform, including: a motion simulation module adapted to drive a product to be detected to perform a predetermined simulation motion simulating various motions of the product on an actual production line and a thickness detection module adapted to detect a thickness of the product driven by the motion simulation module. The motion simulation module may drive the product to be detected to simulate various motions of the product on the actual production line. Thus, conditions of the product on the actual production line may be simulated and reproduced in the laboratory. As a result, the thickness detection experiment platform may be debugged offline in the laboratory without debugging online, normal production of the actual production line is not affected, and debugging of the thickness detection experiment platform becomes easier.

14 Claims, 4 Drawing Sheets

THICKNESS DETECTION EXPERIMENT PLATFORM

CROSS-REFERENCE TO RELATED APPLICATIONS

This application claims the benefit of the filing date under 35 U.S.C. § 119(a)-(d) of Chinese Patent Application No. 201610940078.0 filed on Oct. 31, 2016.

FIELD OF THE INVENTION

The present invention relates to a thickness detection experiment platform and, more particularly, to a thickness detection experiment platform for offline thickness measurement.

BACKGROUND

In the prior art, product thickness detection is completed on the production site. This means that product thickness is detected online. As a result, in the prior art, the thickness detection equipment is directly installed on the production line and debugging of the thickness detection equipment is online. Online debugging of the thickness detection equipment may cause the production line shutdown, seriously decreasing production efficiency of the production line. In addition, online debugging is also very difficult and inconvenient.

SUMMARY

A thickness detection experiment platform, constructed in accordance with the present invention, includes a motion simulation module adapted to drive a product to be detected to perform a predetermined simulation motion simulating various motions of the product on an actual production line and a thickness detection module adapted to detect a thickness of the product driven by the motion simulation module.

A thickness detection module, constructed in accordance with present invention, includes a main frame having a first arm extending in a first direction and a second arm located below the first arm and extending in the first direction. This thickness detection module also includes a first sliding block and a second sliding block slidably mounted on the first arm and the second arm, respectively. This thickness detection module further includes a first laser sensor and a second laser sensor mounted on the first sliding block and the second sliding block, respectively, and a driving mechanism mounted on the main frame and to drive the first sliding block and the second sliding block to slide synchronously in the first direction. The product to be detected is adapted to pass through between the first arm and the second arm without contacting the first laser sensor and the second laser sensor.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EMBODIMENT(S)

Figure 1:
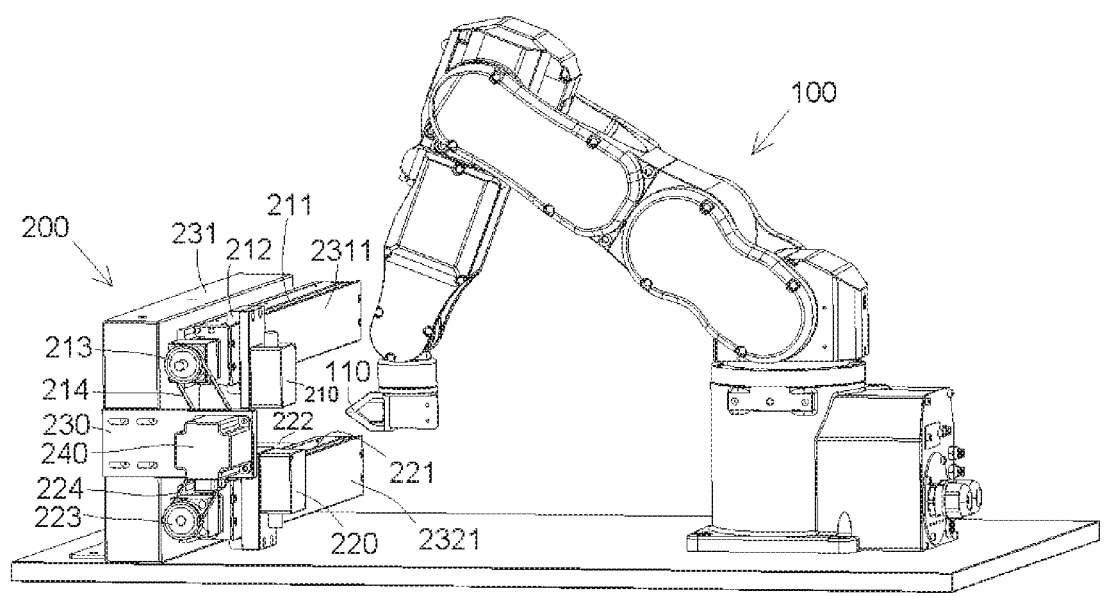
FIG. 1 is a perspective view of a thickness detection experiment platform according to an exemplary embodiment of the present invention.

Exemplary embodiments of the present invention will be described hereinafter in detail with reference to the attached drawings, wherein the like reference numerals refer to the like elements. The present invention may, however, be embodied in many different forms and should not be construed as being limited to the embodiments set forth herein; rather, these embodiments are provided so that the disclosure of the present invention will be thorough and complete, and will fully convey the concept of the present invention to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are shown in order to simplify the drawings.

Figure 2:
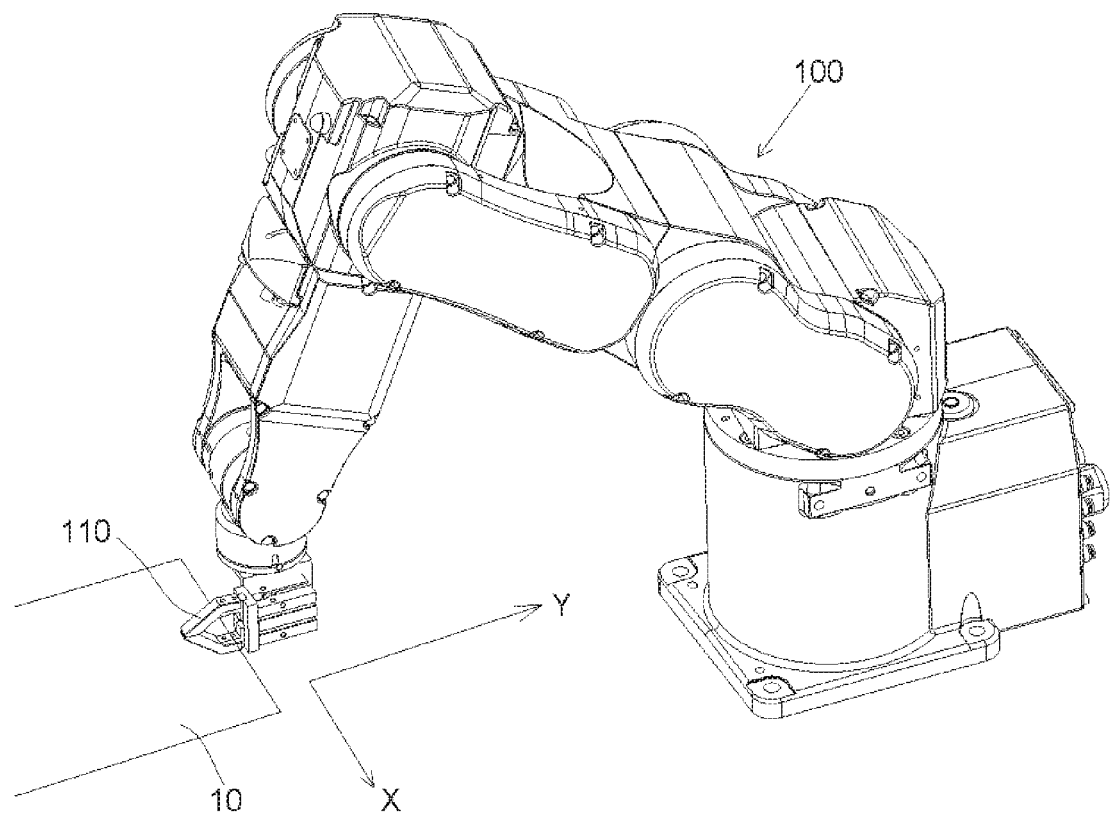
FIG. 2 is a perspective view of a motion simulation module of the thickness detection experiment platform of FIG. 1.
Figure 3:
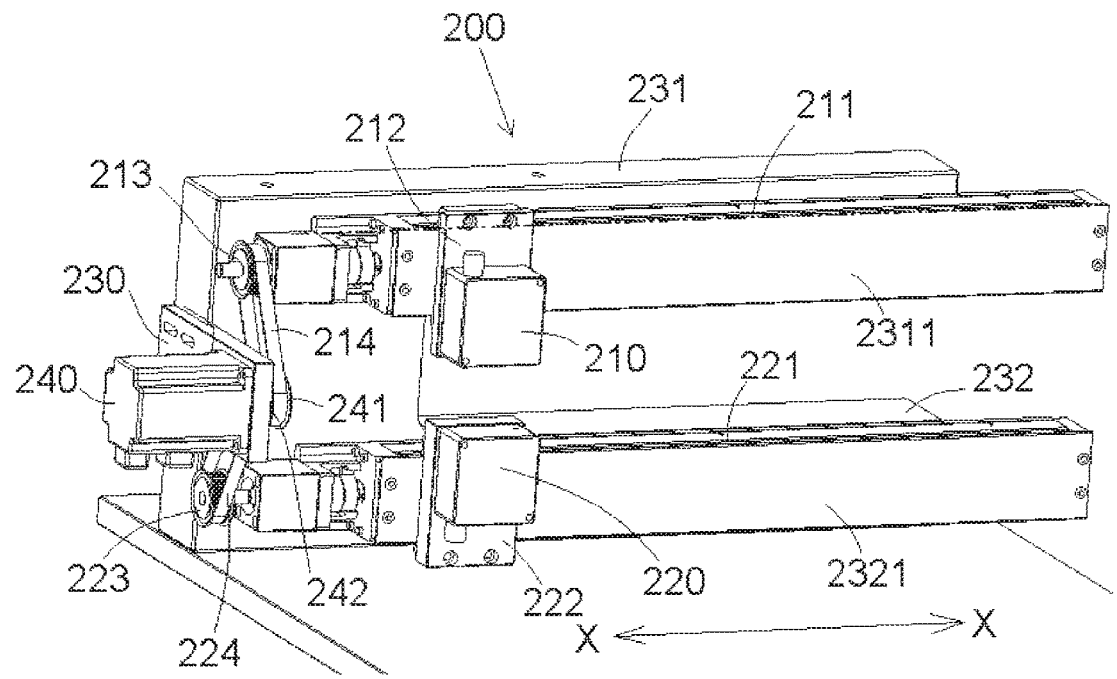
FIG. 3 is a perspective view of a thickness detection module of the thickness detection experiment platform of FIG. 1.

As shown in FIGS. 1-3, in an embodiment of the present invention, the thickness detection experiment platform mainly comprises a motion simulation module 100, 110 and a thickness detection module 200. The motion simulation module 100, 110 is adapted to drive a product 10 to be detected, for example, a steel plate, to perform a predetermined simulation motion of simulating various motions of the product 10 on an actual production line. The thickness detection module 200 is adapted to detect the thickness of the product 10 driven by the motion simulation module 100, 110.

On an actual production line, the motions of the product 10 to be detected, for example a steel plate, may comprise a translation at a predetermined speed, a vibration at a predetermined frequency, and a rotation to a predetermined angle or within a predetermined angular range. Thereby, the predetermined simulation motions at least comprise simulation motions for the translation at a predetermined speed, the vibration at a predetermined frequency, and the rotation to a predetermined angle or within a predetermined angular range of the product 10 on the actual production line. It should be noted that the predetermined simulation motions are not limited to the above listed motions, but also comprise other possible motions of the product 10 on the actual production line.

As shown in FIGS. 1-3, in an embodiment of the present invention, the motion simulation module 100, 110 comprises a robot 100 with a multi-degree of freedom and a gripper 110 mounted on the robot 100. The gripper 110 is adapted to hold the product 10 to be detected. The robot 100 is adapted to drive the product 10 to be detected to perform the predetermined simulation motion. In an embodiment of the present invention, data of various motions of the product 10 on the actual production line may be input previously into a controller of the robot 100. In this way, the robot 100 may drive the product 10 to be detected to simulate various motions of the product 10 on the actual production line. Thereby, conditions of the product 10 on the actual production line may be simulated and reproduced in the laboratory. As a result, the thickness detection experiment platform may be debugged offline in the laboratory without the need of debugging online. Thus, normal production of the actual production line need not be affected, and debugging of the thickness detection experiment platform becomes easier.

In an embodiment of the present invention, the robot 100 may be a six-axis robot with six degrees of freedom. The gripper 110 may include an electric gripper, a pneumatic gripper, or a hydraulic gripper.

As shown in FIGS. 1-3, in an embodiment of the present invention, the thickness detection module 200 is adapted to detect the thickness of the product 10 in a non-contact manner.

As shown in FIGS. 1-3, in an embodiment of the present invention, the thickness detection module 200 mainly comprises a main frame 230, a first sliding block 212, a second sliding block 222, a first laser sensor 210, a second laser sensor 220, and a driving mechanism 240, 241, 242, 211, 213, 214, 221, 223, 224. The main frame 230 comprises a first arm 231 extending in a first direction X and a second arm 232 located below the first arm 231 and extending in the first direction X. The first sliding block 212 and the second sliding block 222 are slidably mounted on the first arm 231 and the second arm 232, respectively. The first laser sensor 210 and the second laser sensor 220 are mounted on the first sliding block 212 and the second sliding block 222, respectively. The driving mechanism 240, 241, 242, 211, 213, 214, 221, 223, 224 is mounted on the main frame 230 and adapted to drive the first sliding block 212 and the second sliding block 222 to slide synchronously in the first direction X.

As shown in FIGS. 1-3, in an embodiment of the present invention, the product 10 to be detected is adapted to pass through between the first arm 231 and the second arm 232 without contacting the first laser sensor 210 and the second laser sensor 220.

As shown in FIGS. 1-3, in an embodiment of the present invention, a distance between the first arm 231 and the second arm 232 of the main frame 230 is adjustable. For example, the first arm 231 is movable with respect to the second arm 232. In this case, the distance between the first arm 231 and the second arm 232 of the main frame 230 may be adjusted by moving the first arm 231 with respect to the second arm 232.

Figure 4:
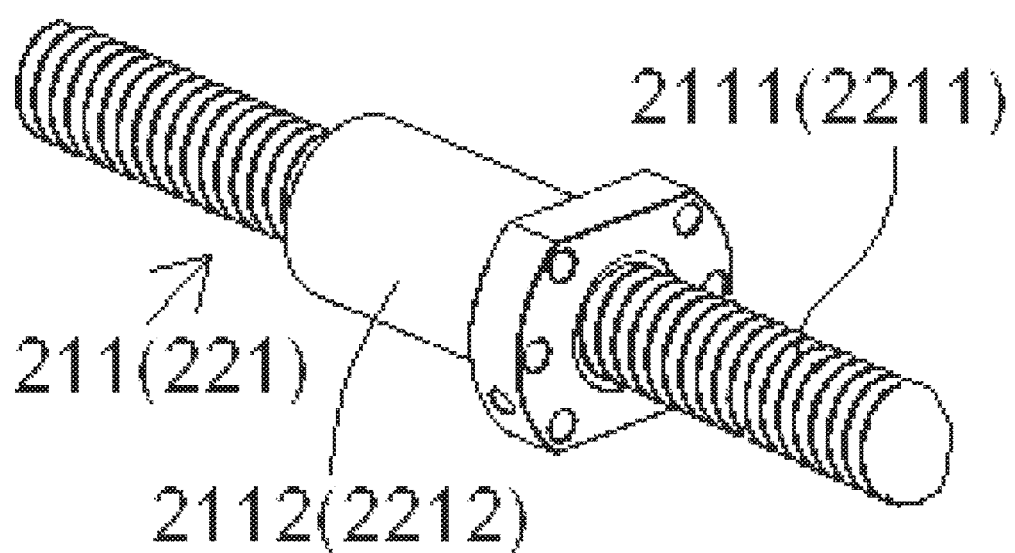
FIG. 4 is a perspective view of a first ball screw and a second ball screw of the thickness detection module of the thickness detection experiment platform of FIG. 1.
Figure 5:
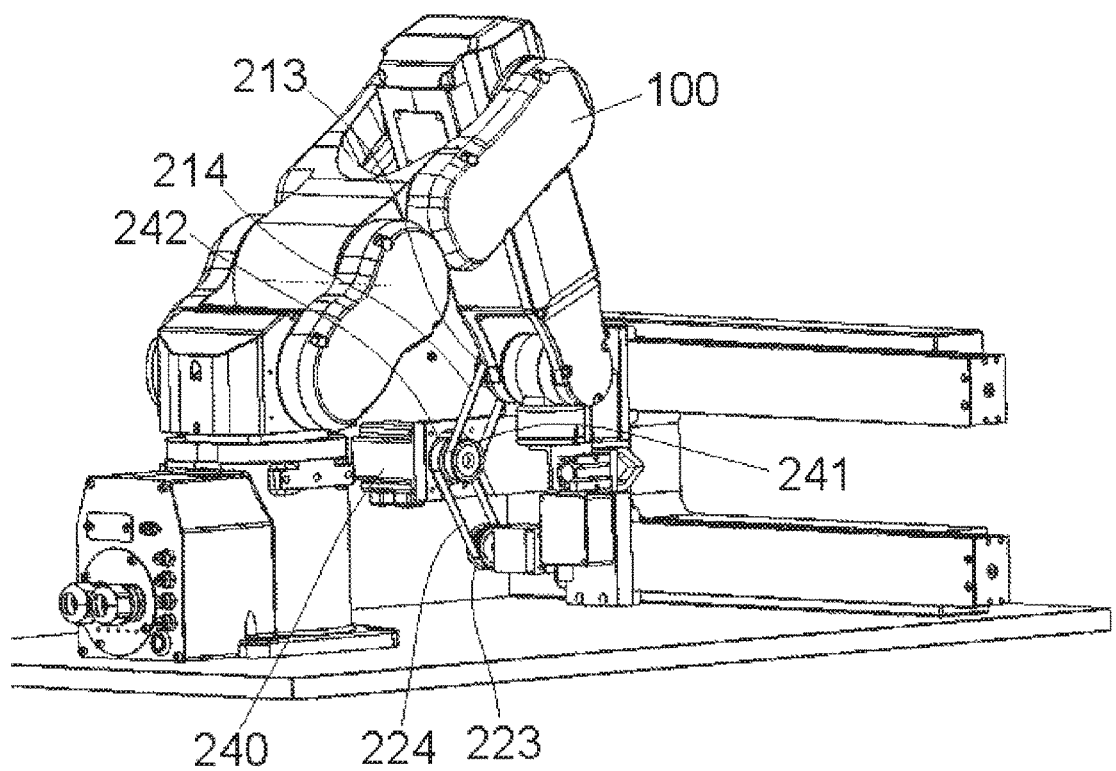
FIG. 5 is a perspective view of a thickness detection experiment platform according to another exemplary embodiment of the present invention.

FIG. 4 is a perspective view of a first ball screw 211 and a second ball screw 221 of the thickness detection module 200 of the thickness detection experiment platform of FIG. 1 and FIG. 5 is a perspective view of a thickness detection experiment platform according to another exemplary embodiment of the present invention.

As shown in FIGS. 1-5, in an embodiment of the present invention the driving mechanism 240, 241, 242, 211, 213, 214, 221, 223, 224 mainly comprises: a first ball screw 211 mounted on a first support frame 2311 of the first arm 231, a second ball screw 221 mounted on a second support frame 2321 of the second arm 232, a first driven pulley 213 coaxially connected to a lead screw 2111 of the first ball screw 211, a second driven pulley 223 coaxially connected to a lead screw 2211 of the second ball screw 221, a single drive motor 240 mounted on the main frame 230, a first driving pulley 241 and a second driving pulley 242 mounted on the an output shaft of the single drive motor 240, a first transmission belt 214 mounted on the first driving pulley 241 and the first driven pulley 213, and a second transmission belt 224 mounted on the second driving pulley 242 and the second driven pulley 223. The first sliding block 212 and the second sliding block 222 are connected to a nut 2112 of the first ball screw 211 and a nut 2212 of the second ball screw 221, respectively.

In this way, rotation motions of the first driven pulley 213 and the second driven pulley 223 may be converted into linear motions of the first sliding block 212 and the second sliding block 222 by the first ball screw 211 and the second ball screw 221, respectively. The single drive motor 240 is adapted to simultaneously drive the lead screw 2111 of the first ball screw 211 and the lead screw 2211 of the second ball screw 221 to rotate at the same speed, so as to drive the first sliding block 212 and the second sliding block 222 to slide synchronously in the first direction X.

It should be noted that, in an embodiment of the present invention, the first sliding block 212 and the second sliding block 222 are driven by the single drive motor 240 to move back and forth in the first direction X. Therefore, periodically changing the rotation direction of the single drive motor 240 is needed.

As shown in FIGS. 1-3, in an embodiment of the present invention, during detecting of the thickness of the product 10, the first laser sensor 210 and the second laser sensor 220 synchronously move back and forth in the first direction X, and the robot 100 moves the product 10 in a second direction Y perpendicular to the first direction X.

In the above various exemplary embodiments of the present disclosure, the motion simulation module may drive the product to be detected to simulate various motions of the product on the actual production line. Thereby, conditions of the product on the actual production line may be simulated and reproduced in the laboratory. As a result, the thickness detection experiment platform may be debugged offline in the laboratory without needing debugging online. Thus, normal production of the actual production line may not be affected, and debugging of the thickness detection experiment platform becomes easier.

It should be appreciated by those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although exemplary embodiments of the present invention have been shown and described, it will be appreciated by those skilled in the art that various changes or modifications may be made in these embodiments without departing from the principles and spirit of the present invention, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A thickness detection experiment platform, comprising:
a motion simulation module adapted to drive a product to be detected to perform a predetermined simulation motion simulating various motions of the product on an actual production line; and
a thickness detection module adapted to detect a thickness of the product driven by the motion simulation module and comprises a main frame further comprising:
(1) a first arm extending in a first direction and a second arm located below the first arm and extending in the first direction,
(2) a first sliding block and a second sliding block slidibly mounted on the first arm and the second arm, respectively,
(3) a first laser sensor and a second laser sensor mounted on the first sliding block and the second sliding block, respectively, and
(4) a driving mechanism mounted on the main frame and adapted to drive the first sliding block and the second sliding block to slide synchronously in the first direction, and
the product being detected passes through between the first arm and the second arm without contacting the first laser sensor and the second laser sensor.

2. The thickness detection experiment platform according to claim 1, wherein the predetermined simulation motion at least comprises a translation at a predetermined speed, a vibration at a predetermined frequency, and a rotation to a predetermined angle or within a predetermined angular range.

3. The thickness detection experiment platform according to claim 1, wherein:
(a) the motion simulation module comprises a robot with a multi-degree of freedom and a gripper mounted on the robot,
(b) the gripper is adapted to hold the product to be detected, and
(c) the robot is adapted to drive the product to be detected to perform the predetermined simulation motion.

4. The thickness detection experiment platform according to claim 3, wherein the robot comprises a six-axis robot with six degrees of freedom.

5. The thickness detection experiment platform according to claim 3, wherein the gripper is at least one of an electric gripper, a pneumatic gripper or a hydraulic gripper.

6. The thickness detection experiment platform according to claim 3, wherein the thickness detection module is adapted to detect the thickness of the product in a non-contact manner.

7. The thickness detection experiment platform according to claim 1, wherein a distance between the first arm and the second arm of the main frame is adjustable.

8. The thickness detection experiment platform according to claim 1, wherein:
(a) the driving mechanism comprises:
(1) a first ball screw mounted on a first support frame of the first arm,
(2) a second ball screw mounted on a second support frame of the second arm,
(3) a first driven pulley coaxially connected to a lead screw of the first ball screw,
(4) a second driven pulley coaxially connected to a lead screw of the second ball screw,
(5) a single drive motor mounted on the main frame,
(6) a first driving pulley and a second driving pulley mounted on an output shaft of the single drive motor,
(7) a first transmission belt mounted on the first driving pulley and the first driven pulley, and
(8) a second transmission belt mounted on the second driving pulley and the second driven pulley,
(b) the first sliding block and the second sliding block are connected to a nut of the first ball screw and a nut of the second ball screw, respectively, and
(c) the single drive motor is adapted to simultaneously drive the lead screw of the first ball screw and the lead screw of the second ball screw to rotate at the same speed, so as to drive the first sliding block and the second sliding block to slide synchronously in the first direction.

9. The thickness detection experiment platform according to claim 8, wherein during detecting the thickness of the product, the first laser sensor and the second laser sensor synchronously move in the first direction, and the robot moves the product in a second direction perpendicular to the first direction.

10. A thickness detection module comprising:
a main frame having a first arm extending in a first direction and a second arm located below the first arm and extending in the first direction;
a first sliding block and a second sliding block slidably mounted on the first arm and the second arm, respectively;
a first laser sensor and a second laser sensor mounted on the first sliding block and the second sliding block, respectively; and
a driving mechanism mounted on the main frame to drive the first sliding block and the second sliding block to slide synchronously in the first direction.

11. The thickness detection module according to claim 10 adapted to detect the thickness of a product in a non-contact manner.

12. The thickness detection module according to claim 11, wherein the first laser sensor and a second laser sensor are mounted on the first sliding block and the second sliding block, respectively, spaced apart so the product being detected passes through between the first arm and the second arm without contacting the first laser sensor and the second laser sensor.

13. The thickness detection module according to claim 12, wherein a distance between the first arm and the second arm of the main frame is adjustable.

14. The thickness detection module according to claim 13, wherein during detecting the thickness of the product, the first laser sensor and the second laser sensor synchronously move in the first direction.

* * * * *